(12) United States Patent
Calmettes et al.

(10) Patent No.: US 10,293,847 B2
(45) Date of Patent: May 21, 2019

(54) DRIVE DEVICE FOR A TROLLEY OR SIMILAR

(71) Applicant: MOTEURS LEROY-SOMER, Angouleme (FR)

(72) Inventors: Didier Calmettes, Puymoyen (FR);
Eric Coupart, Angouleme (FR);
Françis Sourisseau, Chateauneuf (FR);
Ago-Tchalim Pato, Ruelle sur Touvre (FR)

(73) Assignee: MOTEURS LEROY-SOMER, Angouleme (FR)

( * ) Notice: Subject to any disclaimer, the term of this patent is extended or adjusted under 35 U.S.C. 154(b) by 39 days.

(21) Appl. No.: 15/533,341

(22) PCT Filed: Nov. 30, 2015

(86) PCT No.: PCT/EP2015/078066
§ 371 (c)(1),
(2) Date: Jun. 5, 2017

(87) PCT Pub. No.: WO2016/087375
PCT Pub. Date: Jun. 9, 2016

(65) Prior Publication Data
US 2018/0154928 A1    Jun. 7, 2018

(30) Foreign Application Priority Data
Dec. 3, 2014 (FR) .................... 14 61863

(51) Int. Cl.
*B60K 7/00* (2006.01)
*B62D 5/04* (2006.01)
(Continued)

(52) U.S. Cl.
CPC .......... *B62D 5/0418* (2013.01); *B60K 7/0007* (2013.01); *B60K 17/046* (2013.01);
(Continued)

(58) Field of Classification Search
CPC .... B62D 5/0418; B62D 7/023; B60K 7/0007; B60K 17/046; B60K 17/303; B60K 2007/0038; B60K 2007/0092
See application file for complete search history.

(56) References Cited

U.S. PATENT DOCUMENTS 3,439,766 A * 4/1969 Frost .................... B60K 17/046
                                                           180/308
3,608,661 A * 9/1971 Arnot .................... B60K 7/0007
                                                           180/10
(Continued)

FOREIGN PATENT DOCUMENTS

DE        199 04 552 A1    9/1999
DE    20 2005 020631 U1    6/2006
(Continued)

OTHER PUBLICATIONS

Jan. 28, 2016 International Search Report issued in International Patent Application No. PCT/EP2015/078066.

*Primary Examiner* — Joseph M Rocca
*Assistant Examiner* — Michael R Stabley
(74) *Attorney, Agent, or Firm* — Joel S. Armstrong

(57) ABSTRACT

A drive device for a handling trolley, including: a chassis; a wheel carrier; a drive wheel; a steering motor for rotating the wheel carrier relative to the chassis; a reduction gear connecting the steering motor to the wheel carrier, the reduction gear including a planetary gear set including an internal sun gear, at least one planet gear, and a planet carrier on which the planet gear is mounted, a ring gear surrounding the internal sun gear and the planet gear. The shaft of the steering motor is fixed relative to the internal sun gear, the wheel carrier is fixed relative to either the planet carrier or the ring gear, and the chassis is fixed relative to the other one of the two components.

14 Claims, 3 Drawing Sheets

Figure 1:
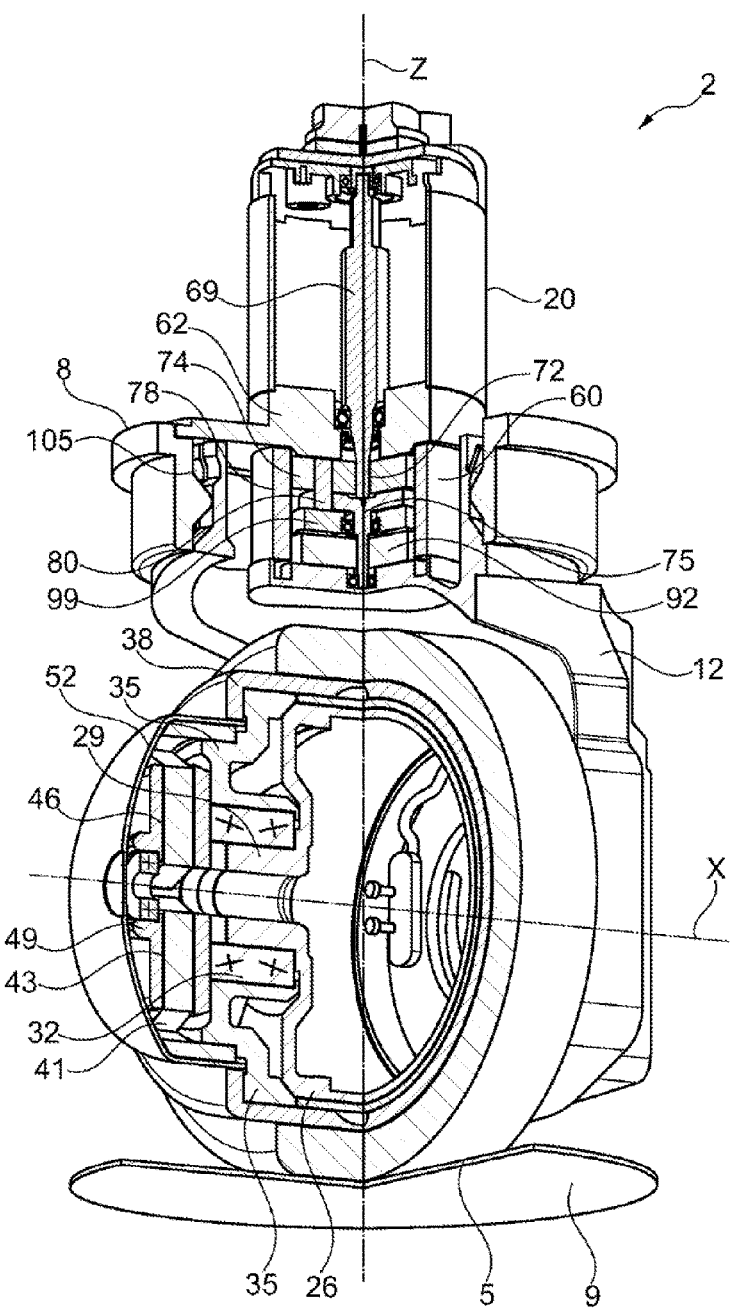

(51) Int. Cl.
*B60K 17/30* (2006.01)
*B62D 7/02* (2006.01)
*B60K 17/04* (2006.01)
*B66C 9/14* (2006.01)

(52) U.S. Cl.
CPC ............ *B60K 17/303* (2013.01); *B62D 7/023* (2013.01); *B66C 9/14* (2013.01); *B60K 2007/0038* (2013.01); *B60K 2007/0092* (2013.01); *B60Y 2200/45* (2013.01); *B60Y 2200/62* (2013.01)

(56) References Cited

U.S. PATENT DOCUMENTS

| | | | |
|---|---|---|---|
| 6,367,571 B1 | 4/2002 | Schwarz | |
| 6,852,061 B2* | 2/2005 | Schoon | B60K 7/0007 180/65.51 |
| 7,591,340 B2* | 9/2009 | Scharfenberg | B60K 7/0007 180/13 |
| 7,617,890 B2* | 11/2009 | Romig | A01D 34/008 180/12 |
| 8,449,424 B2* | 5/2013 | Schoon | B60K 17/046 475/153 |
| 2007/0267234 A1 | 11/2007 | Rogg | |
| 2007/0295542 A1 | 12/2007 | Raue | |

FOREIGN PATENT DOCUMENTS

| | | |
|---|---|---|
| EP | 1 857 317 A1 | 11/2007 |
| EP | 1 870 314 A1 | 12/2007 |
| FR | 2 821 024 A1 | 8/2002 |

* cited by examiner

DRIVE DEVICE FOR A TROLLEY OR SIMILAR

The present invention relates to a drive device for a handling trolley or similar, in particular any vehicle moving in an industrial or goods transporting environment.

Among the various modes of motorization of handling trolleys, the driving wheel is the most widespread.

In the majority of cases, this driving wheel is directional, being rotatable about a turning vertical axis.

The turning diameter of the wheel must be as small as possible, particularly when the driving wheel is not central, in particular so as to allow the distance between the wheels of the trolley to be spaced as far apart as possible and to increase the stability thereof.

In the known driving wheels, the wheel is rotated about the central axis thereof through a reduction gear by a first direct current or asynchronous electric motor which, due to the spatial requirement thereof, must be arranged above the wheel if the intention is to meet the requirements of the trolley manufacturers. The wheel is orientated about the turning vertical axis through a reduction gear by a second direct current or asynchronous electric motor. The second electric motor is laterally offset on the frame relative to the wheel and meshes with a ring gear connected to the supporting means of the wheel, in order to orientate the wheel along the turning vertical axis.

This results in a quite large vertical spatial requirement for the two electric motors and a relatively complex structure.

Patent application FR 2 821 024 discloses a drive wheel, the first electric motor of which is internal to the wheel to free up an additional space above the latter.

There is a need for further improvement of the drive devices in order, in particular, to further reduce the spatial requirement thereof and simplify the structure thereof.

The aim of the invention is to meet this need by proposing a drive device for a handling trolley or similar, including
  a frame,
  a wheel support movable relative to the frame about a turning axis Z,
  a driving wheel carried by the wheel support, and movable relative to the wheel support about an axis of rotation X,
  a steering motor for rotating the wheel support relative to the frame, having a rotor rotating about an axis of rotation which is coincident with the turning axis Z.

Such a drive device proves to be compact and of simple and robust construction.

The space saving achieved at the drive device offers new possibilities in the design of the trolley.

The arrangement of the steering motor in the turning axis Z makes it possible, in particular, to facilitate the passage of the electric cables for powering the motors and to reduce the risks of these cables being pulled out.

Preferably, the drive wheel is made in accordance with the teaching of the patent application FR 2 821 024, i.e. it includes a wheel and an electric motor for driving the wheel which may have permanent magnets. Such an electric motor may be arranged inside the wheel and free up the space above the latter.

Preferably, the axis of the rotor of the electric motor for driving the wheel is merged with the axis of rotation X of the wheel.

The turning axis Z of the wheel support is, preferably, perpendicular to the axis of rotation X of the wheel, in particular intersecting the latter.

The device may include a bearing arranged between the frame and the wheel support to allow the rotation of the latter on the frame, the bearing being fixed relative to the frame or to the wheel support, preferably to the frame.

Preferably, the drive device includes a reduction gear connecting the steering motor to the wheel support. The reduction ratio may be between 10 and 1000, more preferably between 20 and 300.

The reduction gear may include an epicyclic train.

According to a first embodiment, the epicyclic train may include a single reduction stage, in particular:
  an inner sun gear rotated by the shaft of the steering motor,
  at least one planet gear rotated about a physical axle by the inner sun gear, and
  a planet gear carrier on which the planet gear is rotatably mounted,
  an outer ring gear or sun gear surrounding the inner sun gear and the planet gear.

Preferably, the shaft of the steering motor is fixed relative to the inner sun gear, the wheel support being fixed relative to one element from the planet gear carrier and from the ring gear and the frame being fixed relative to the other element from the planet gear carrier and from the ring gear.

The epicyclic train may include at least two planet gears, more preferably at least three planet gears spread about the inner sun gear.

The end of the shaft of the steering motor may be machined to form the inner sun gear. This makes it possible to reduce the spatial requirement of the motor and to limit the number of pieces of the device. In an alternative, the shaft of the turning motor is coupled to an attached pinion, mounted on the shaft, which forms the inner sun gear.

The planet gear carrier may be fixed relative to the wheel support. The frame is then fixed relative to the ring gear. The aforementioned physical axle is rotated by the steering motor about the turning axis Z.

In an alternative, the wheel support is fixed relative to the ring gear. The frame is then fixed relative to the planet gear carrier, and the latter is fixed relative to the turning axis Z. The planet gear/gears is/are rotated about the respective geometric axes of rotation T thereof and rotate the ring gear about the turning axis Z.

The wheel support includes, preferably, an opening for connecting the planet gear carrier to the frame. The planet gear carrier may include at least one bearing to allow the rotation of the wheel support about the planet gear carrier.

According to a second embodiment, the epicyclic train may include two reduction stages, in particular:
  an inner sun gear rotated by the shaft of the steering motor,
  at least a first planet gear meshing with the inner sun gear and rotated about a first planet gear physical axle,
  an intermediate stage planet gear carrier supporting the first planet gear and rotated about the turning axis Z,
  at least a second planet gear meshing with the intermediate stage planet gear carrier and rotated about a second planet gear physical axle,
  a ring gear meshing with the first and second planet gears, one element from the second planet gear axle and from the ring gear being fixed relative to the wheel support and the other element from the second planet gear axle and from the ring gear being fixed relative to the frame.

The epicyclic train may include several first planet gears and several second planet gears.

The epicyclic train may include an output stage planet gear carrier supporting the second planet gear physical axle or axles and rotated about the turning axis Z.

As in the previous example, the end of the shaft of the steering motor may be machined to form the inner sun gear.

The wheel support may be fixed relative to the second planet gear axle or axles. Then, the frame is fixed relative to the ring gear.

In an alternative, the wheel support is fixed relative to the ring gear. Then, the frame is fixed relative to the second planet gear axle or axles. The wheel support includes, preferably, an opening for connecting the second planet gear physical axle, in particular the output stage planet gear carrier, to the frame.

Figure 2:
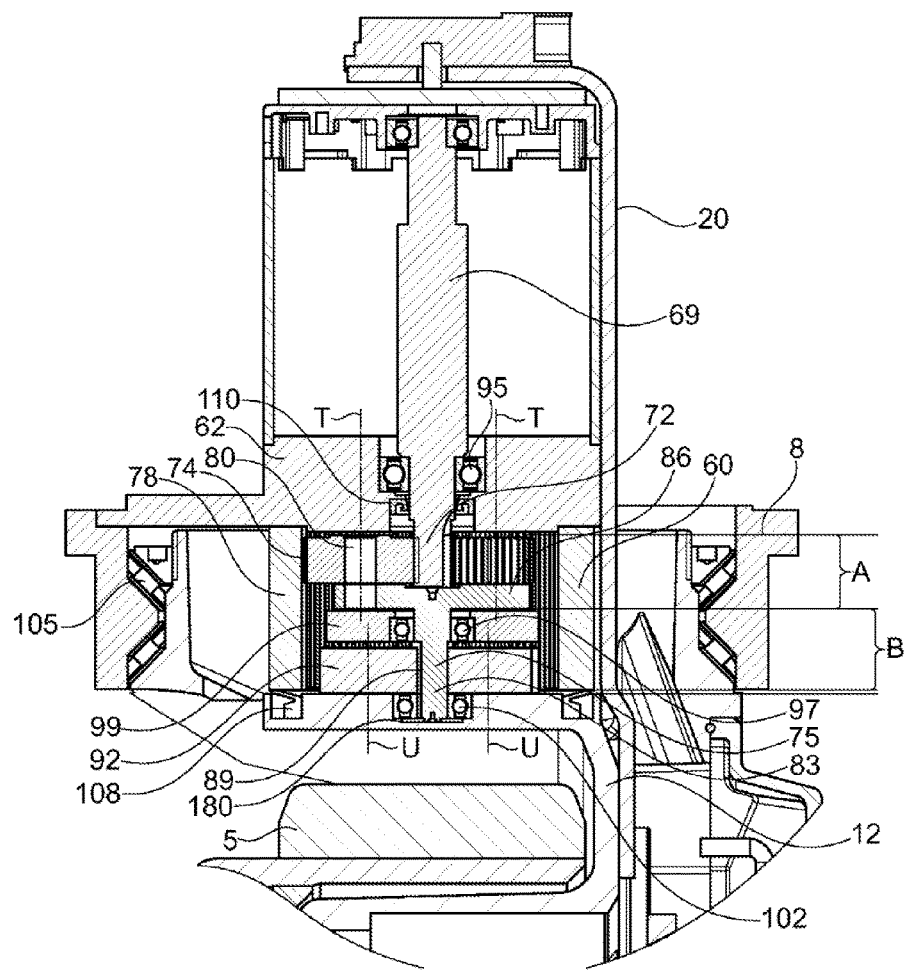
Figure 3:
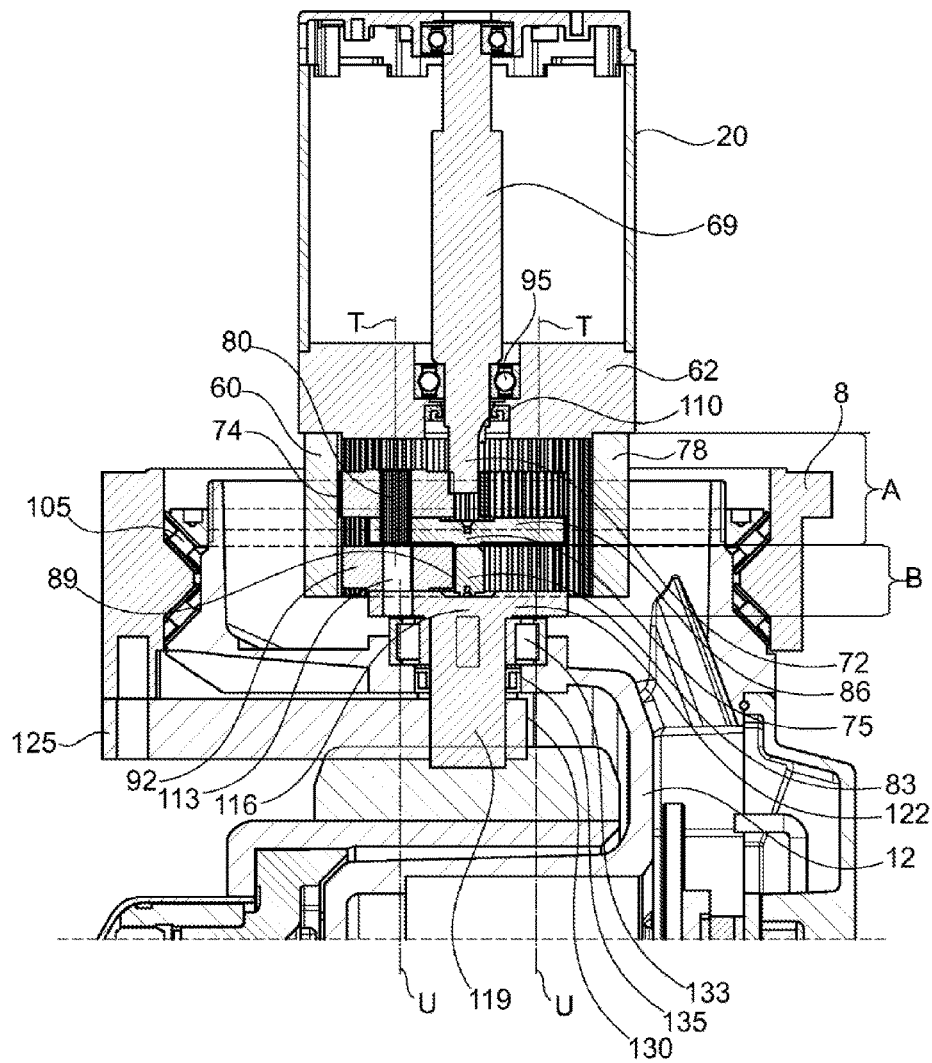

The invention can be better understood upon reading the following detailed description, of implementation examples thereof that are non-limiting, and upon examining the appended drawing, in which:

FIG. 1 is a schematic view in perspective and with a partial axial section of a drive device according to the invention, FIG. 2 shows a sectional partial view of the device of FIG. 1, and FIG. 3 is a view, similar to FIG. 2, of an alternative device.

FIGS. 1 and 2 show a drive device example 2 according to the invention, including a driving wheel 5 and a frame 8 on which the wheel 5 is mounted by means of a wheel support 12.

The wheel 5 is rotatable about a geometric axis of rotation X, normally horizontal, allowing the wheel to move on a surface S.

The wheel support 12 is rotatable about a turning geometric axis Z, normally vertical, allowing the wheel 5 to be orientated on the surface S.

The geometric axes X and Z are preferably perpendicular and intersect each other, as is illustrated.

The wheel support 12 carries the wheel 5 while leaving the wheel free to rotate about the axis X.

The wheel support 12 is formed with a tubular part 29 of axis X. The wheel includes a hub 35 which rotates about the tubular part 29 by means of a bearing 32.

A rim 38 is fixed on the hub 35 by means of screws 41.

The wheel 5 is rotated about the geometric axis X by an electric motor that is not shown, in particular through a reduction gear, preferably having an epicyclic train 43. The electric motor is arranged inside a large-diameter tubular part 26 of the wheel support 12. The shaft of the electric motor extends inside the tubular part 29 according to the axis X and it is coupled by the end thereof to the reduction gear 43. In the example illustrated in FIG. 1, the end of the shaft of the motor meshes with planet gears 46, which are carried by a planet gear carrier 49 fixed relative to the wheel support 12.

The ring gear 52 of the epicyclic train is fixed to the hub 35. As a result, the rotation of the shaft of the electric motor rotates the planet gears 46 which drive the ring gear 52 and thus the wheel 5 about the geometric axis of rotation X thereof.

The wheel support 12 is rotated about the geometric axis Z by a steering motor 20 through a reduction gear 60, in particular having an epicyclic train.

The steering motor 20 has a casing 62 fixed to the frame 8.

It may be of any suitable type, and includes a rotor and a stator which are not shown.

The epicyclic train 60 may have one or more reduction stages. In the example illustrated in FIGS. 1 and 2, the epicyclic train 60 has two reduction stages A and B.

The end 72 of the rotor shaft is formed with a gearing making up the inner sun gear of the first reduction stage A, which includes first planet gears 74 rotatably mounted on physical axles 80 extending along geometric axes of rotation T parallel to the turning axis Z. These axles 80 are supported by an intermediate stage planet gear carrier 75. The first planet gears 74 mesh, firstly, with the end 72 of the shaft and, secondly, with a ring gear 78. The latter is fixed relative to the frame 8 and is immobile relative to the axis Z such that the intermediate stage planet gear carrier 75 is rotated about the latter.

As may be seen more particularly in FIG. 2, the intermediate stage planet gear carrier 75 includes a shaft 83 along the axis Z rigidly connected by a plate 86 to the physical axles 80 of the first planet gears 74. The shaft 83 of the planet gear carrier 75 includes, at the periphery thereof, teeth 89 defining the inner sun gear of the second reduction stage B. The latter includes second planet gears 92 rotatably mounted on physical axles, which is not visible in FIGS. 1 and 2, rotating about geometric axes U parallel to the axis Z. The second planet gears 92 mesh, firstly, with the gearing system 89 and, secondly, with the ring gear 78, immobile relative to the axis Z. The axles of the second planet gears 92 are fixed relative to the wheel support 12. As a result, the planet gear carrier 75, by rotating the second planet gears 92, causes the wheel support 12 to rotate relative to the axis Z.

The rotation of the shaft 69 thus rotates the wheel support 12 and makes it possible to orientate the wheel 5.

Preferably, the reduction ratio of the reduction gear 60 is between 10 and 1000, more preferably between 20 and 300.

The inner sun gear is, preferably, formed directly on the shaft 69. In an alternative, the inner sun gear is a piece attached to the shaft 69.

Likewise, the teeth 89 of the planet gear carrier 75 are, preferably, formed directly on the shaft of the latter. In an alternative, the inner sun gear of the second reduction stage B is a piece attached to the shaft 83 of the planet gear carrier 75.

A bearing 95 is, preferably, arranged between the shaft 69 of the rotor and the casing 62 of the motor 20.

Another bearing 97 may be arranged between the central axle 83 of the planet gear carrier 75 and a supporting means 99 for the plate 86 of the planet gear carrier 75.

The central axle 82 of the planet gear carrier 75 may extend as far as and into a housing 100 of the wheel support 12 and a bearing 102 may be arranged in this housing 100 between the end of the central axle 83 and the wheel support 12.

A bearing 105 may also be arranged between the wheel support 12 and the frame 8.

A seal 108 may be arranged between the wheel support 12 and the ring gear 78, and a seal 110 may be arranged between the shaft 69 of the rotor and the casing 62.

The example illustrated in FIG. 3 differs from that of FIGS. 1 and 2 in that the ring gear 74 is fixed relative to the wheel support 12 and the physical axles 113 of the second planet gears 92 are fixed relative to the frame 8.

The physical axles 113 of the second planet gears 92 are supported by an output stage planet gear carrier 116. The latter includes a shaft 119 extending along the axis Z and connected by a plate 122 to the physical axles 113 of the second planet gears 92. The shaft 119 passes through an opening 130 of the wheel support 12 and is fixed by a connecting arm 125 to the frame 8. Preferably, a bearing 133 and a seal 135 are arranged between the wheel support 12 and the shaft 119.

Thus, when the motor is actuated, the shaft 69 rotates the first planet gears 74 about the geometric axes of rotation T thereof and the physical axles 80 of the first planet gears 74 pivot about the axis Z with the intermediate stage planet gear carrier 75. The latter rotates the second planet gears 92 via the teeth 89. Since the physical axles 113 of the second planet gears are fixed relative to the axis Z, the ring gear 78 is rotated about the axis Z with the wheel support 12, which makes it possible to orientate the wheel 5.

The number of first and second planet gears may be greater than two, preferably equal to three.

The invention is not limited to the examples which have just been described.

In particular, the drive device may include three reduction stages.

The expression "including one" is synonymous with "including at least one" unless otherwise specified.

The invention claimed is:

1. A drive device for a handling trolley, including
a frame,
a wheel support movable relative to the frame about a turning axis,
a driving wheel carried by the wheel support, and movable relative to the wheel support about an axis of rotation,
a steering motor for rotating the wheel support relative to the frame, having a rotor rotating about an axis of rotation which is coincident with the turning axis,
a reduction gear connecting the steering motor to the wheel support, the reduction gear including an epicyclic train including:
an inner sun gear rotated by the shaft of the steering motor,
at least one planet gear rotated about a physical axle by the inner sun gear, and
a planet gear carrier on which the planet gear is rotatably mounted,
a ring gear surrounding the inner sun gear and the planet gear,
the shaft of the steering motor being fixed relative to the inner sun gear, the wheel support being fixed relative to one element from the planet gear carrier and from the ring gear and the frame being fixed relative to the other element from the planet gear carrier and from the ring gear, the wheel support being fixed relative to the ring gear and including an opening for connecting the planet gear carrier to the frame, the planet gear carrier including at least one bearing to allow the rotation of the wheel support about the planet gear carrier.

2. The drive device as claimed in claim 1, the turning axis of the wheel support being perpendicular to the axis of rotation of the wheel.

3. The drive device as claimed in claim 1, the turning axis of the wheel support intersecting the axis of rotation of the wheel.

4. The drive device as claimed in claim 1, the epicyclic train including at least two planet gears spread about the inner sun gear.

5. The drive device as claimed in claim 1, the end of the shaft of the steering motor being machined to form the inner sun gear.

6. The drive device as claimed in claim 1, the wheel support being fixed relative to the planet gear carrier.

7. The drive device as claimed in claim 1, the epicyclic train having two reduction stages and including:
an inner sun gear rotated by the shaft of the steering motor,
at least a first planet gear meshing with the inner sun gear and rotated about a first planet gear physical axle,
an intermediate stage planet gear carrier supporting the first planet gear and rotated about the turning axis,
at least a second planet gear meshing with the intermediate stage planet gear carrier and rotated about a second planet gear physical axle,
a ring gear meshing with the first and second planet gears,
one element from the second planet gear axle and from the ring gear being fixed relative to the wheel support and the other element from the second planet gear axle or from the ring gear being fixed relative to the frame.

8. The drive device as claimed in claim 7, the epicyclic train including several first planet gears and several second planet gears.

9. The drive device as claimed in claim 7, wherein the epicyclic train includes an output stage planet gear carrier supporting the second planet gear physical axle or axles and rotated about the turning axis.

10. The drive device as claimed in claim 7, wherein the end of the shaft of the steering motor is machined to form the inner sun gear.

11. The drive device as claimed in claim 7, the wheel support being fixed relative to the second planet gear axle or axles.

12. The drive device as claimed in claim 7, the wheel support being fixed relative to the ring gear.

13. The drive device as claimed in claim 12, wherein the end of the shaft of the steering motor is machined to form the inner sun gear, the wheel support including an opening for connecting the output stage planet gear carrier to the frame.

14. The drive device as claimed in claim 1, including a bearing arranged between the frame and the wheel support to allow the rotation of the latter on the frame, the bearing being fixed relative to the frame or to the wheel support.

* * * * *